(12) United States Patent
Alaniz (10) Patent No.: US 8,229,866 B2
(45) Date of Patent: Jul. 24, 2012

(54) METHOD AND SYSTEM FOR DETECTING CORRELATION IN DATA SETS

(76) Inventor: Alex Alaniz, Los Alamos, NM (US)

( * ) Notice: Subject to any disclaimer, the term of this patent is extended or adjusted under 35 U.S.C. 154(b) by 503 days.

(21) Appl. No.: 12/553,988

(22) Filed: Sep. 4, 2009

(65) Prior Publication Data

US 2011/0060703 A1     Mar. 10, 2011

(51) Int. Cl.
*G06F 15/18*     (2006.01)
(52) U.S. Cl. .............................................. 706/12
(58) Field of Classification Search ........ 706/12
See application file for complete search history.

(56) References Cited

U.S. PATENT DOCUMENTS

| | | | | |
|---|---|---|---|---|
| 7,444,308 B2 * | 10/2008 | Guyon et al. | .................... | 706/12 |
| 7,542,947 B2 * | 6/2009 | Guyon et al. | .................... | 706/12 |
| 7,921,068 B2 * | 4/2011 | Guyon et al. | .................... | 706/45 |
| 8,126,825 B2 * | 2/2012 | Guyon | ............................ | 706/12 |

OTHER PUBLICATIONS

Segmentation of Motion Objects from Surveillance Video Sequences Using Temporal Differencing Combined with Multiple Correlation, Murali, S.; Girisha, R.; Advanced Video and Signal Based Surveillance, 2009. AVSS '09. Sixth IEEE International Conference on Digital Object Identifier: 10.1109/AVSS.2009.15 Publication Year: 2009 , pp. 472-47.*
Segmentation of Motion Objects from Four Successive Video Frames Simultaneously Using Multiple Correlation, Girisha, R.; Murali, S.; Advances in Computing, Control, & Telecommunication Technologies, 2009. ACT '09. International Conference on Digital Object Identifier: 10.1109/ACT.2009.86 Publication Year: 2009 , pp. 319-323.*
Segmentation of motion objects from surveillance video sequences using partial correlation, Girisha, R.; Murali, S.; Image Processing (ICIP), 2009 16th IEEE International Conference on Digital Object Identifier: 10.1109/ICIP.2009.5414526 Publication Year: 2009 , pp. 1129-1132.*

* cited by examiner

*Primary Examiner* — Michael B Holmes (57) ABSTRACT

A method and system for detecting correlations in a data set is provided. The method includes determining one or more parameters associated with one or more data sets. The one or more parameters are determined at runtime for generating one or more test data sets from the one or more data sets. A test data of the one or more test data sets comprises one or more objects and one or more indices. The one or more objects are associated with the one or more indices. The method further includes computing one or more correlation coefficients associated with the one or more test data sets. The one or more correlation coefficients are computed for detecting correlation corresponding to the one or more test data sets.

22 Claims, 9 Drawing Sheets

METHOD AND SYSTEM FOR DETECTING CORRELATION IN DATA SETS

FIELD OF THE INVENTION

The invention generally relates to analyzing data sets. More specifically, the invention relates to method and system for detecting correlation corresponding to data sets.

BACKGROUND OF THE INVENTION

Nowadays, a plurality of computing resources and data-acquisition technologies are employed for collecting data. Data are pieces of information that represents the quantitative and qualitative attributes of one or more objects. Examples of data may include, but are not limited to a number, a letter, a word, a sentence, a symbol, a graph, a picture, an image and a character. An object may represent an idea, a variable, a product, a subject, a concept, a physical phenomenon, a psychic phenomenon, an entity and so on. For example, a physical phenomenon like weather is an object. Similarly, a product like a Stock Keeping Unit (SKU) is an object. In another example, a concept like number of people who like Pink Floyd is an object. The one or more objects are usually stored in a memory. Correlations between the one or more objects are usually identified for sorting the data, for identifying relationship between the one or more objects, for predicting or anticipating a value of the one or more objects in future, past and present and for determining variance of a dependent object from an independent object.

However, with the exponential growth in volume and type of data associated with the one or more objects it is becoming increasingly difficult to analyze, sort and reduce the data and to identify a relation, a correlation, a variance and a covariance associated with the one or more objects. Subject matter experts who have knowledge and information associated with the one or more objects are usually employed to analyze the one or more objects. These subject matter experts identify the relation, the correlation, the variance and the covariance associated with the one or more objects. Moreover, these subject matter experts analyze the one or more objects to identify relationship patterns and missing data, compute statistics, filter objects matching a certain criteria and so on. For example, a meteorologist may analyze weather data for the last five years of a city to identify patterns and correlation between weather parameters like temperature, humidity, soil temperature and wind direction and so on. In another example, an expert having knowledge about weather and stock markets may identify patterns and detect correlation between the weather data and the stock market data. However, with an increase in the number of input, input variables, independent variables, dependent variables and exogenous variables associated with the one or more objects, the subject matter experts find it difficult to analyze the one or more objects.

Some of the existing technologies employ various tools for detecting correlation associated with the one or more objects. Examples of such tools may include, but are not limited to Matlab©, Mathematica©, Excel©, Statistical Analysis System (SAS©), Scientific Publishing Services (SPS©), S-Plus© and Forecast Expert Toolkit©. These tools may need a human or a subject matter expert to analyze the one or more objects.

Therefore, there is a need for a method and a system to analyze the one or more objects for identifying correlations associated with the one or more objects in an efficient manner.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily in combinations of method steps and system components related to detect correlations in data sets. Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and systems for analyzing one or more data sets. A method includes determining one or more parameters associated with the one or more data sets. The one or more parameters are determined at runtime for generating one or more test data sets from the one or more data sets. The method further includes computing one or more correlation coefficients associated with the one or more test data sets. Subsequently, detecting a correlation corresponding to the one or more test data sets based on the one or more correlation coefficients.

Figure 1:
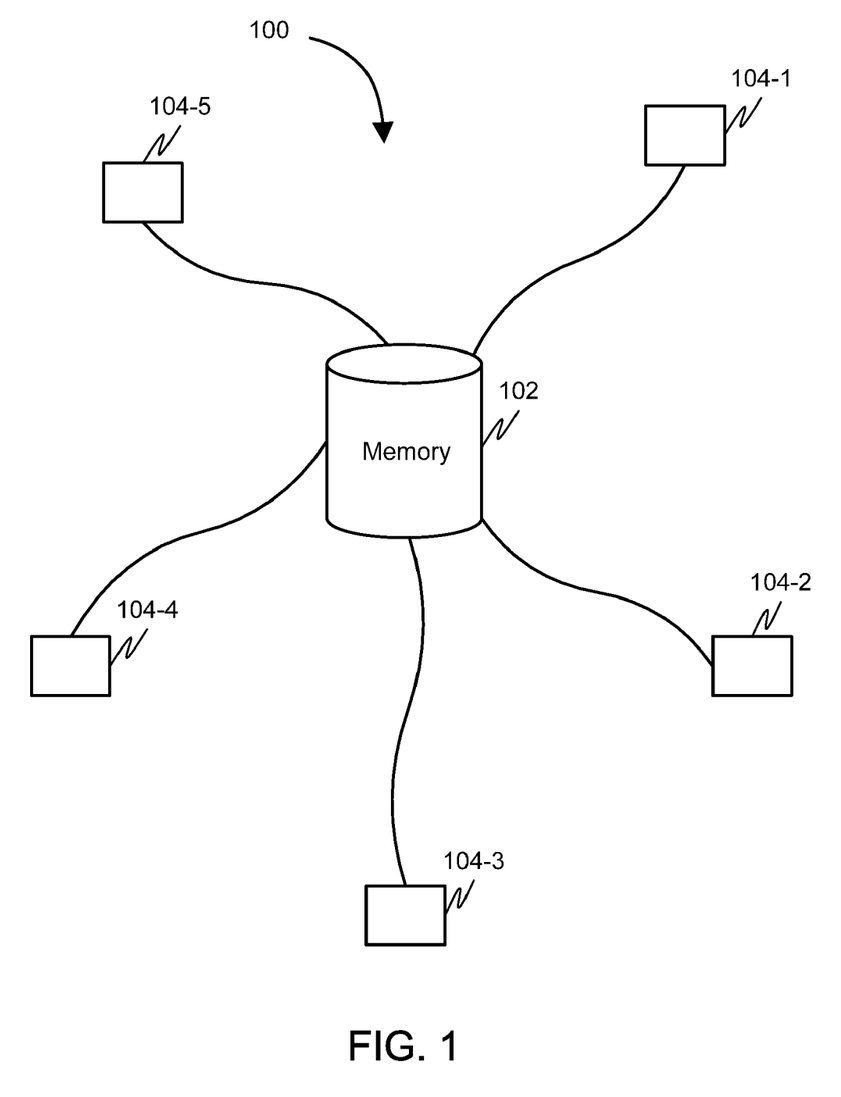
FIG. 1 illustrates an environment (that is exemplary) in which various embodiments of the invention may function.

FIG. 1 illustrates an environment 100 (that is exemplary) in which various embodiments of the invention may function. Environment 100 includes a memory 102 and one or more data sources 104-n communicatively coupled to memory 102. As depicted in FIG. 1, one or more data sources 104-n include a data source 104-1, a data source 104-2, a data source 104-3, a data source 104-4, and a data source 104-5. Examples of one or more data sources 104-n may include, but are not limited to a cell phone, a laptop, a server, a satellite and a world wide web server.

Memory 102 includes one or more data sets. A data set of the one or more data sets may include one or more objects. In addition, the data set may include one or more indices. Examples of the one or more objects may include, but are not limited to stock prices, commodity prices, future prices, economic indicators, Deoxyribonucleic acid (DNA), Ribonucleic acid (RNA), protein and general polymer monomers, weather parameters. The weather parameters may include, but are not limited to temperature, inches of precipitation, wind speed, humidity, and so forth. Examples of an index of the one or more indices may include, but are not limited to space and time.

The one or more objects and information associated with the one or more objects are rendered to memory 102 by one or more data sources 104-n. For example, server 108 may provide information associated with one or more of, a stock price, a future price, and an economic indicator to memory 102. Similarly, satellite 110 may provide information associated with weather to memory 102. Thus, memory 102 stores information associated with the one or more objects.

The one or more objects are represented in one or more of a tabular form, a tree form, a hierarchical form, a list form and so on. For example, a data set may include weather parameters in a table. The rows of the table may represent the weather parameters such as a temperature, a wind pressure, a wind direction, a humidity level, and so on. The columns of the table may represent indices such as a position, time duration and a time instant. Thus, the columns include numerical values of the parameters based on the indices. It will be apparent to a person skilled in the art that the data set of the one or more data sets may store the one or more objects in any different form.

By way of another example, the one or more objects may be one or more monomers associated with a polymer structure stored in a table. In the table, each row of the table may be associated with a monomer and each column of the table may be associated with an index. The index may be a strictly increasing position index. In this case, the table may include columns associated with monomer position and rows associated with different polymers. Thus, the one or more monomers are stored in the table based on position of the one or monomers in the polymer structure. The number of rows may be greater than the number of columns in the table.

Further, memory 102 may be used for organizing, managing, accessing and sorting the one or more objects based on predefined criteria. For example, the one or more objects may be stored in memory 102 according to a strictly increasing index such as, time duration associated with the one or more objects. Similarly, the one or more objects may be stored in memory 102 based on a position or a spatial distribution of the one or more objects.

Figure 2:
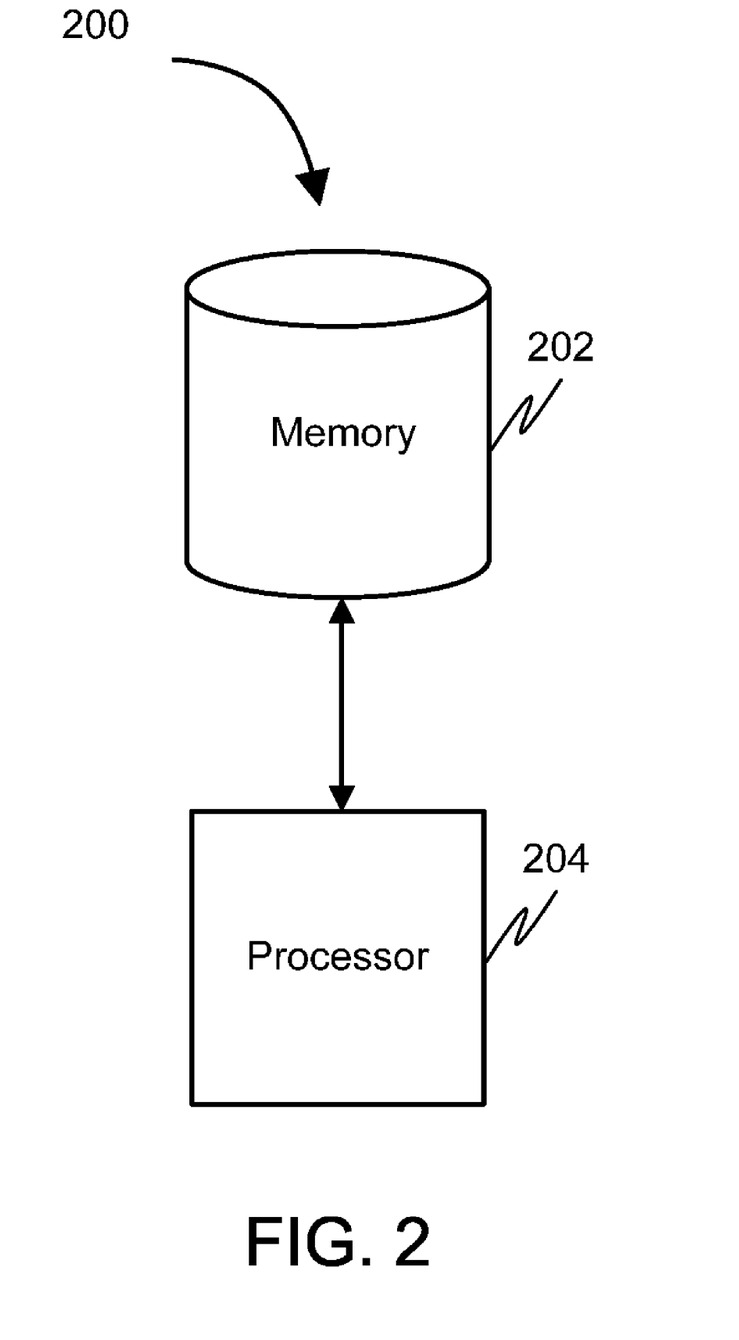
FIG. 2 illustrates a system for analyzing one or more data sets, in accordance with an embodiment of the invention.

FIG. 2 illustrates a system 200 for analyzing one or more data sets, in accordance with an embodiment of the invention. System 200 includes a memory 202, and a processor 204 coupled to memory 202. Additionally, memory 202 is communicatively coupled to a plurality of data sources such as, a cell phone, a laptop, a server, a satellite and a World Wide Web server (not shown in the figure). Memory 202 stores the one or more data sets. It will be apparent to a person skilled in the art that the one or more data sets may be stored in one or more memories. A data set of the one or more data sets includes one or more objects and information associated with the one or more objects. In addition, the data set may include one or more indices. This has already been explained in conjunction with FIG. 1.

The one or more objects associated with the one or more data sets stored in memory 202 may be periodically updated. The one or more objects may be updated when there is a change associated with the one or more objects or at a predefined interval. The predefined interval may include, but is not limited to an hourly basis, a daily basis, a weekly basis, a monthly basis and a yearly basis and so on.

Processor 204 collects the one or more data sets from memory 202 and determines one or more parameters associated with the one or more data sets at runtime. The runtime refers to an execution period of processor 204. The one or more parameters are automatically identified without any apriori guidelines and input from a user. Alternatively, parameters may be identified based on user inputs. Examples of the one or more parameters may include, but are not limited to a context, a weight, a time period, a strength and a relevance associated with the one or more objects of the one or more data sets. For example, processor 204 may process the one or more data sets to determine a context of the one or more objects. The context may correspond to a topic and a subject of the one or more objects. Similarly, processor 204 may process the one or more data sets to determine a time period for which the one or more objects are stored in the one or more data sets. Moreover, processor 204 may determine a relevance of an object of a first data set to an object of a second data set.

After determining the one or more parameters, processor 204 generates one or more test data sets from the one or more data sets at runtime based on the one or more parameters. A test data set of the one or more test data sets includes one or more objects of the one or more data sets and the one or more indices. An index of the one or more indices may be but is not limited to, a strictly increasing index, a unique index, a spatial index and a temporal index.

To generate the one or more test data sets, processor 204 fuses the information associated with the one or more data sets stored in memory 202 based on the one or more parameters. The information corresponds to the one or more objects of the one or more data sets. Fusing of the information involves merging of the one or more objects associated with the one or more data sets. While fusing the one or more data sets, processor 204 selects a set of information, a subset of information or a super set of information associated with the one or more data sets. Processor 204 may employ one or more of a smoothing technique and a filtering technique for fusing the one or more data sets.

Examples of the smoothing technique may include, but are not limited to Moving Average (MA) smoothing. Exponentially Weighted Moving Average (EWMA) smoothing, an Autoregressive Moving Average (ARMA) and an Autoregressive Integrated Moving Average algorithms. Further, examples of the filtering technique may include, but are not limited to a low pass filter, a high pass filter, a band-pass filter, a Kalman filter, Hodrick-Prescott filter, Wiener filter, Butterworth filter, a digital filter, a time series filter and so on. This is explained further in conjunction with FIG. 3.

For example, the one or more data sets may include a first data set and a second data set. The first data set may include information corresponding to people who have searched for resume on the web in the last ten years. A second data set may include information about people who have applied for health insurance in the last three years. Processor 204 may fuse the first data set and the second data set by selecting number of people who have searched for resume and number of people who have applied for health insurance in the last one year. In another example, processor 204 may fuse the first data set and the second data set by selecting from the first data set people who have searched for resume in more than three languages and selecting from the second test data set people who have health insurance of more than USD 5000. Processor 204 may fuse the information associated with the first data set and the second data set to generate a test data set. The test data set includes information about the first data set and the second data set.

After generating the one or more test data sets, processor 204 reduces the one or more test data sets to a canonical form. Processor 204 may perform one or more operations on the one or more test data sets to convert the one or more test data sets in to the canonical form. An operation of the one or more operations may include, but is not limited to a matrix decomposition, a Cholesky decomposition, a Single Value Decomposition (SVD), an averaging, a Jordan decomposition and factorization. Reducing the one or more test data sets into the canonical form facilitates reduction in size, storage requirements and computational time associated with the one or more test data sets. This is further explained in conjunction with FIG. 5.

Thereafter, processor 204 transforms the one or more test data sets into a function space. Examples of the function space may include, but are not limited to sines and cosines, orthogonal polynomials, spherical harmonics, Hadamard matrices and so on. If an index of the one more indices associated with the one or more test data sets is time, processor 204 transforms the one or more test data sets into a frequency domain. If an index of the one more indices associated with the one or more test data sets is position, processor 204 transforms the one or more test data sets into a momentum domain. It will be apparent to a person skilled in the art that various other transforming techniques such as wavelet transformation and Walsh-Hadamard transformation may be used for transforming the one or more test data sets into the function space. This is further explained in conjunction with FIG. 6.

Subsequent to transformation of the one or more test data sets, processor 204 computes one or more correlation coefficients at runtime. The one or more correlation coefficients may be computed without apriori guidelines or user inputs. A correlation coefficient of the one or more correlation coefficients indicates a correlation between objects of the one or more test data sets. Moreover, the correlation coefficient corresponds to a relationship present in the one or more test data sets. The correlation coefficient may also indicate a strength or a degree of correlation between the objects. For example, objects associated with rainfall in a test data set are strongly correlated with objects associated with temperature. The one or more correlation coefficients may be represented as a numerical value and a range. In such a scenario, a correlation coefficient may have a value of zero and may vary between a range of zero and one. This is further explained in conjunction with FIG. 3.

Thereafter, processor 204 calculates one or more lags corresponding to the one or more test data sets. The one or more lags are associated with the one or more objects of the one or more test data sets. The one or more lags may be identified using auto and cross-correlation techniques. A lag of the one or more lags may be but are not limited to, a phase lag and a time lag. The lag may be a numerical value. The numerical value may be a zero value and a near zero value.

For example, a first test data set may include information about one hundred people who applied for a health insurance in the month of May. Additionally, the first test data may include information about three hundred people who searched for resume in the month of August. Processor 204 may detect correlation between the number of people who applied for health insurance and the number of people who searched for the resume. Subsequently, processor 204 may identify a time lag between the number of people who applied for health insurance and the number of people who searched for resume. Similarly, processor 204 may also identify a position or a space lag between the number of people who applied for health insurance and the number of people who searched for resume.

Once the one or more lags are calculated, processor 204 automatically constructs one or more forecasting models. The one or more forecasting models may be constructed using one or more of a dynamic programming and an optimization method. A forecasting model of the one or more forecasting models is constructed for the one or more objects of the one or more test data sets based on the correlations associated with the one or more objects. Examples of the forecasting model may include, but are not limited to a rolling forecast model, a moving average model, an exponential smoothing model, an extrapolation model, a linear prediction model, a trend estimation model, a growth curve model, a regression analysis model, an Autoregressive Moving Average (ARMA) model, an Autoregressive Integrated Moving Average (ARIMA) model and an econometrics model. This is further explained in conjunction with FIG. 6.

Thereafter, processor 204 projects the one or more objects into the future using the one or more forecasting models. Subsequently, processor 204 computes error associated with the forecasting model. An error associated with the forecasting model corresponds to a variability or a spread associated with the forecasting model. Examples of the error may include, but is not limited to a variance, a standard deviation and an interquartile range. Moreover, the error may be one or more of an observational error, a measurement error and an intrinsic error associated with the forecasting model. The error may be an automatically computed value. Processor 204 determines a difference in an expected value and an observed value of the forecasting model to compute the error. The expected value may be a predefined value. The observed value is obtained during the projection of the one or more objects using the forecasting model. Processor 204 then compares the error with a threshold error value. The threshold error value may indicate the minimum variance or error that is allowable in the one or more forecasting models. Processor 204 may employ one or more statistical tests to compare the error with the threshold error value. Examples of the one or more statistical tests may include, but are not limited to Analysis of Variance (ANOVA), Multiple Analysis of Variance (MANOVA), Scheffe's method, Levene's test, Bartlett's test, and the Brown-Forsythe test. This is further explained in conjunction with FIG. 7.

Based on the comparison between the error and the threshold error value, processor 204 modifies the correlation coefficient. For example, a forecasting model with a correlation coefficient of 0.5 may give an error that is more than a threshold error value associated with the forecasting model. Thus, processor 204 may change the correlation coefficient such that the error falls below the threshold error value.

Alternatively, processor 204 may automatically refine the one or more test data sets based on the comparison between the error and the threshold error value. Processor 204 may perform operations on the one or more test data sets to modify the one or more objects associated with the one or more test data sets, add a new object to the one or more test data sets and generate a new test data set and so on. Thereafter, processor 204 may automatically re-detect correlations associated with the refined one or more test data sets. In another scenario, processor 204 may refine the one or more test data sets and modify the correlation coefficient. Then, processor 204 may automatically detect correlations associated with the refined one or more test data sets. This is further explained in conjunction with FIG. 8.

Figure 3:
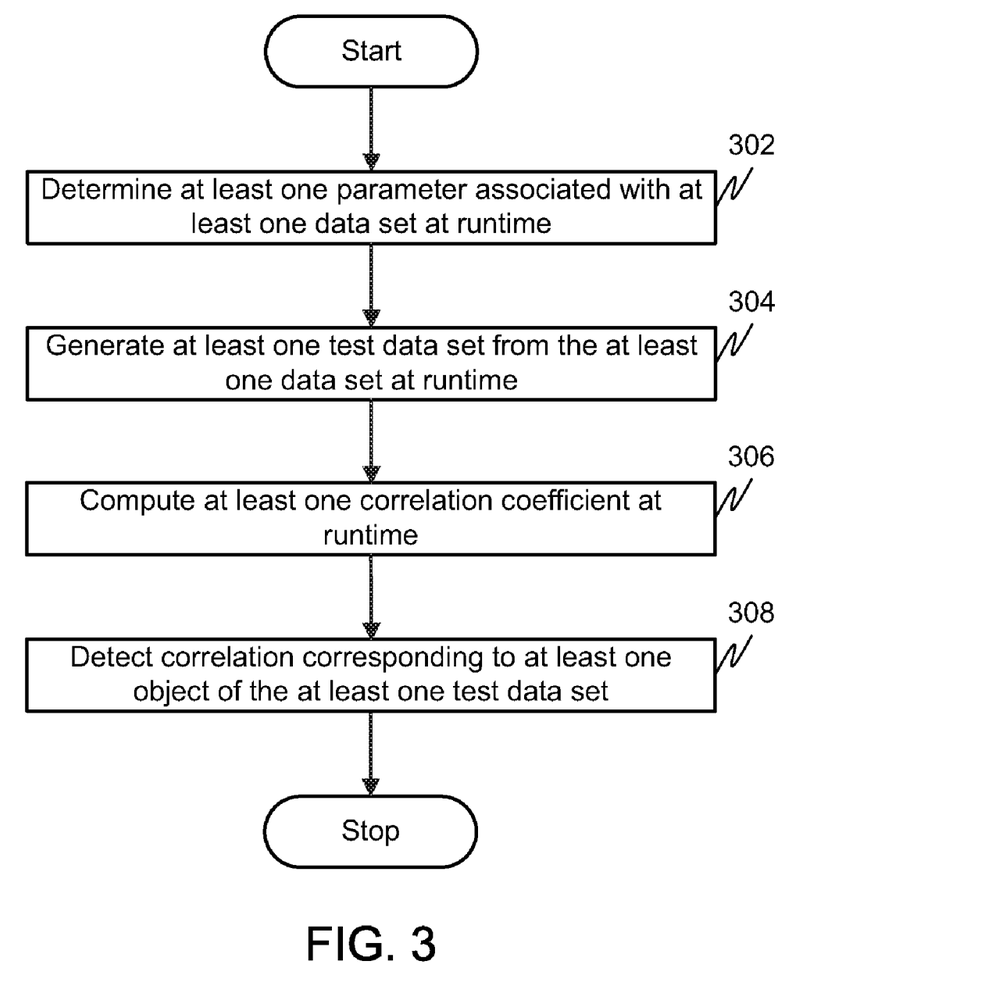
FIG. 3 illustrates a flowchart of a method for automatically detecting correlations associated with one or more test data sets, in accordance with an embodiment of the invention.

FIG. 3 illustrates a flowchart of a method for automatically detecting correlations associated with one or more test data sets, in accordance with an embodiment of the invention. The one or more data sets are obtained from memory 202. The one or more data sets may also be obtained directly from one or more of an external data source, an external memory and a data acquisition system. A data set of the one or more data sets may include one or more objects and one or more indices. This has already been explained in conjunction with FIG. 2.

At step 302, processor 204 determines one or more parameters associated with the one or more data sets at runtime. Examples of the one or more parameters may include, but are not limited to a context, a weight, a time period, a strength and a relevance associated with the one or more objects of the one or more data sets. After determining the one or more parameters, at step 304, processor 204 generates one or more test data sets from the one or more data sets based on the one or more parameters. The one or more objects associated with a data set of the one or more data sets may be associated with a spatial index and a time index.

In an example, a test data set may be generated from a first data set associated with El Nino and La Nina, and a second data set associated with automobiles. The first data set may include information about one or more objects associated with El Nino and La Nina. The one or more objects may include, surface temperature, wind direction, air pressure and oscillation. The information associated with one or more objects may be represented in the first data set as a function of time or position. An object such as, the surface temperature may be represented as a function of time. In this case, the surface temperature may be stored or updated on a weekly basis. Whereas, another object such as, the wind pressure may be represented in the data set as a function of position. The wind pressure may vary based on latitude and longitude and all such variations may be stored in the first data set.

Similarly, the second data set may include information about one or more objects associated with automobiles. The one or more objects associated with automobiles may include, but are not limited to prices, vehicle type, manufacturer, engine, dealer, number of automobiles sold and insurance provider and so on. The information associated with one or more objects may be represented in the second data set as a function of time or position. An object such as, the number of automobiles sold may be represented as function of time. In such a case, the object may be for example, number of cars sold in the month of January or number of bicycles sold during the rainy season. Similarly, the number of automobiles sold may be represented as a function of position. In this scenario, the object may be for example, number of cars sold in a mountainous region, a plain, a coastal area and a desert.

Referring to the one or more parameters used to generate the one or more test data sets, processor 204 may identify the one or more parameters automatically without any apriori guidelines or inputs from a user. Alternatively, parameters may be identified based on user inputs. Considering the previous example, processor 204 may generate the test data set from the first data set and the second data set based on automatically identified parameters. The generated test data set may include information about the one or more objects associated with El Nino and La Nina and information about the one or more objects associated with automobiles. The objects present in the generated test data set may be selected from one or more objects of the two data sets based on the automatically identified parameters.

Thereafter, at step 306, processor 204 computes one or more correlation coefficients at runtime. The one or more correlation coefficients are computed by processor 204 without any apriori guidelines or user inputs.

Subsequent to computing the one or more correlation coefficients, at step, 308, processor 204 automatically detects correlation associated with the one or more test data sets. The correlation represents the degree of relationship and strength between the one or more objects associated with the one or more test data sets. The correlations associated with the one or more test data sets are detected based on the one or more correlation coefficients. The correlations between the one or more objects may be compared with the one or more correlation coefficients to categorize the correlations as one of a high correlation, a moderate correlation, a low correlation and an anti-correlation.

The one or more correlation coefficients may be user-defined coefficients or automatically computed coefficients. Referring to the previous example, processor 204 may detect a correlation between the surface temperature and the number of people buying an automobile. The correlation may indicate a degree of relationship between the number of people buying an automobile and different values of the surface temperature. Thereafter, the correlation is compared with a correlation coefficient to identify whether the correlation is a moderate correlation or a high correlation or a low correlation or an anti-correlation.

Figure 4:
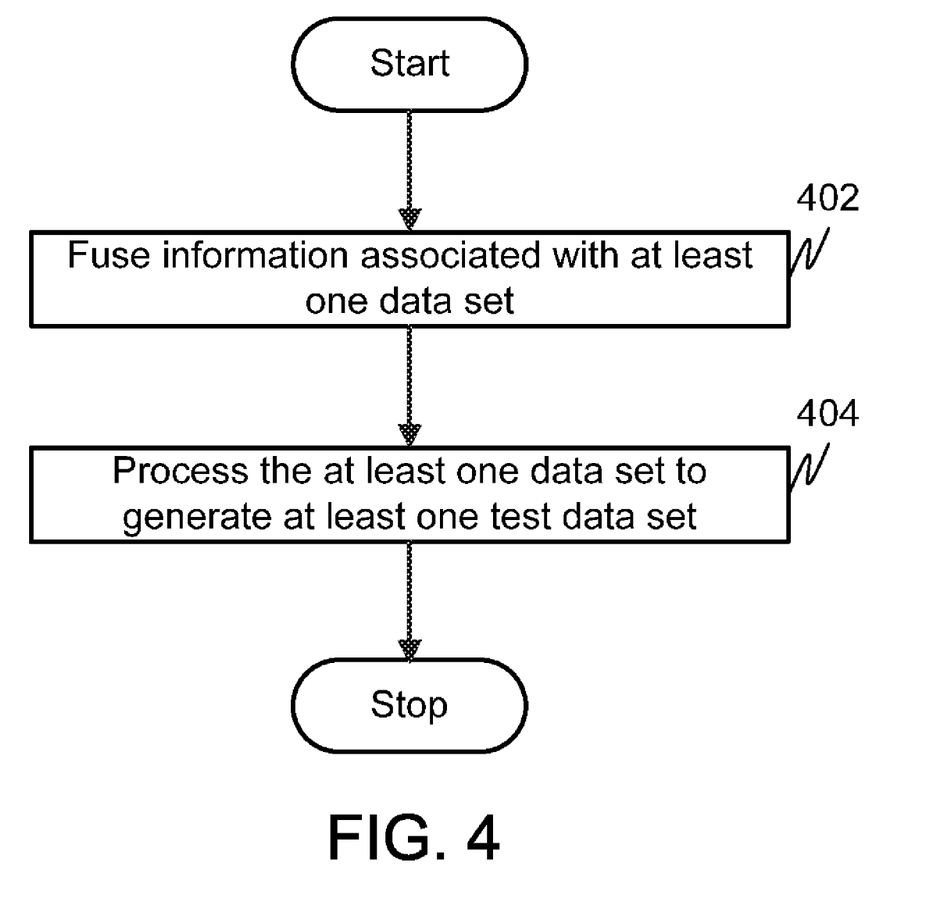
FIG. 4 illustrates a flowchart of a method for generating one or more test data sets from one or more data sets, in accordance with an embodiment of the invention.

Turning now to FIG. 4, a flowchart of a method for generating the one or more test data sets from the one or more data sets in accordance with an embodiment of the invention is illustrated. At step 402, processor 204 fuses information associated with the one or more data sets based on the one or more parameters. The information corresponds to the one or more objects of the one or more data sets. Fusing of the information associated with the one or more data sets results in merging of the one or more objects associated with the one or more data sets. This has already been explained in conjunction with FIG. 2.

During fusing, processor 204 selects a set of information from the one or more data sets based on predefined criteria. The set of information corresponds to the one or more objects of the one or more data sets. The one or more objects may be one of a subset, a complete set and a superset of the one or more objects. The predefined criteria may include one or more of a context, a weight and a time period. For example, a context may be a temperature associated with a city. Whereas, the weight may be a value related to temperature of the city and the time period may be one or more of a day, a week, a month, a year and a decade and so on.

In an embodiment of the invention, processor 204 may perform selection of the set of the information using one or more of a smoothing technique and a filtering technique. The smoothing technique may categorize the one or more objects based on their importance or significance. During the smoothing process, the objects that are less significant among the one or more objects may be removed. It will be apparent to a person skilled in the art that other smoothing techniques known in the art may be used to smooth the one or more objects.

The one or more filtering techniques may determine objects that are irrelevant. The irrelevant objects may correspond to noise or junk associated with the one or more objects. Processor 204 thereafter removes the irrelevant objects determined from the one or more objects.

After selecting the set of information, at step 404, processor 204 automatically processes the one or more objects associated with the one or more data sets to generate the one or more test data sets. The processing may be done based on the one or more objects that are common to the one or more data sets. Alternatively, processor 204 may process the one or more data sets based on the one or more objects that do not share any relationship with each other. The one or more objects may be stored in the one or more test data sets in one or more of a tabular form, a tree form and a list form.

Figure 5:
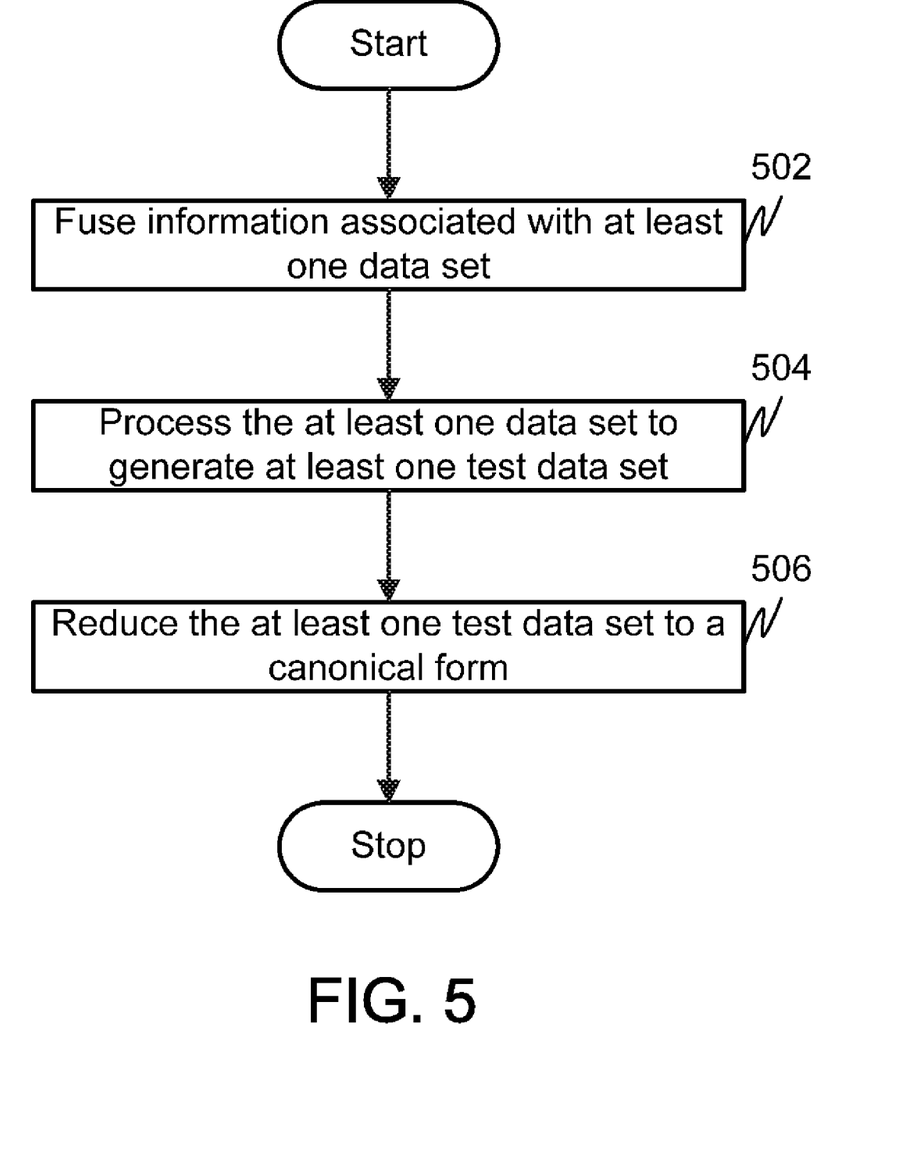
FIG. 5 illustrates a flowchart of a method for reducing one or more test data sets to a canonical form, in accordance with an embodiment of the invention.

FIG. 5 illustrates a flowchart of a method for reducing the one or more test data sets to a canonical form, in accordance with an embodiment of the invention. At step 502, processor 204 fuses information associated with the one or more data sets. Thereafter, processor 204 selects the set of information from the one or more data sets. Subsequently, processor 204 processes the one or more data sets to generate the one or more test data sets at step 504. This has already been explained in conjunction with FIG. 4.

After generating the one or more test data sets, at step 506, processor 204 reduces the one or more test data sets to the canonical form. The one or more test data sets are reduced to the canonical form based on one or more of a range, a rank, a pseudo inverse, a null space and an error associated with one or more objects of the one or more test data sets. Examples of the canonical form may include, but are not limited to a diagonal matrix with reordering, a diagonal matrix with real positive entries, a negation normal form, a conjuctive normal form, a disjunctive normal form, an algebraic normal form, a Prenex normal form, a Skolem normal form, a Jordan normal form, a Frobenius normal form and a Smith normal form. Thus, by reducing the one or more test data sets to the canonical form the size and computational load of the one or more test data sets reduces. Further, the one or more test data sets are represented in a unique and compact manner. In addition, as the canonical form is symmetric, the algebraic manipulations and operations are performed in a more efficient manner.

Processor 204 may employ one or more factorization algorithms to reduce the one or more test data sets to the canonical form. Examples of the one or more factorization algorithms may include, but are not limited to Singular Value Decomposition (SVD), eigendecomposition, polar decomposition, Principal Components Analysis (PCA), Empirical Orthogonal Functions (EOFs), Canonical Correlation Analysis (CCA) and latent semantic analysis.

Figure 6:
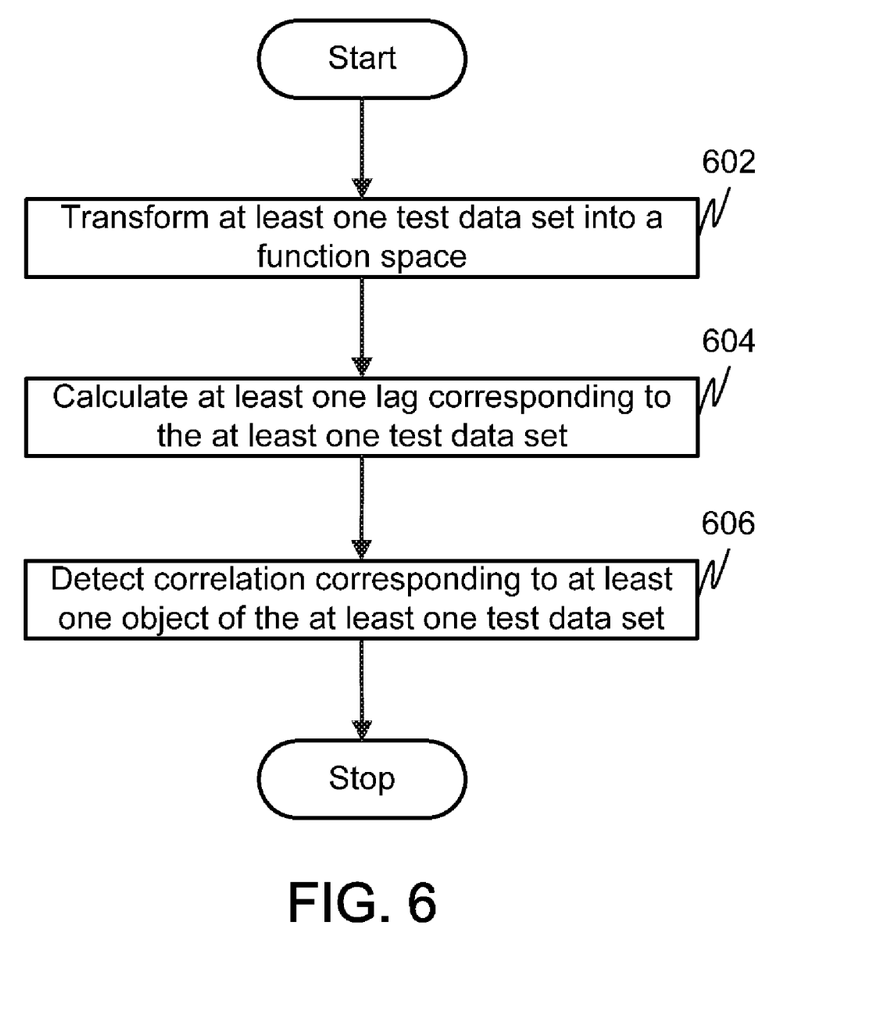
FIG. 6 illustrates a flowchart of a method for transforming one or more test data sets into a function space, in accordance with an embodiment of the invention.

FIG. 6 illustrates a flowchart of a method for transforming the one or more test data sets into a function space, in accordance with an embodiment of the invention. After reducing the one or more test data sets associated with the one or more indices into the canonical form, at step 602, processor 204 transforms the one or more test data sets into a function space. Examples of function space may include, but are not limited to sines and cosines, orthogonal polynomials, spherical harmonics, Laplace space, Sobolev space, Hardy space, Holder space and Hadamard matrices. Processor 204 may employ one or more mathematical transform techniques to transform the one or more test data sets. Examples of the one or more mathematical transform techniques may include, but are not limited to Fourier transform, wavelet and Walsh-Hadamard transform.

For example, Fourier transform may transform a first test data set associated with a time index into a frequency domain. In another example, Fourier transform may transform a second test data set associated with a position index into a momentum domain. Thereafter, processor 204 may further reduce the one or more test data sets to a standard form. In an embodiment of the invention, the standard form may be a canonical form. Reducing the one or more test data sets to the canonical form has already been explained in conjunction with FIG. 5.

Thereafter, processor 204 calculates one or more lags corresponding to the one or more test data sets at step 604. The one or more lags correspond to the one or more objects of the one or more test data sets. Examples of the one or more lags may include, but are not limited to a phase lag and a time lag. For example, a first test data set includes information about one or more weather parameters associated with a city in the month of June. A second test data set may include information about one or more diseases in the city. Processor 204 may calculate a time lag between the onset of a disease and the time when it rained last in the city.

Processor 204 may employ one or more mathematical methods to calculate the one or more lags. Examples of the one or more mathematical methods may include, but are not limited to a sliding dot product, an autocorrelation method, a cross-correlation method, a convolution method and an auto covariance method. Thereafter, processor 204 detects correlations associated with the one or more test data sets based on the one or more correlation coefficients. This has already been explained in conjunction with FIG. 3. Once the correlations are detected, processor 204 may again calculate one or more lags associated with the one or more test data sets.

Figure 7:
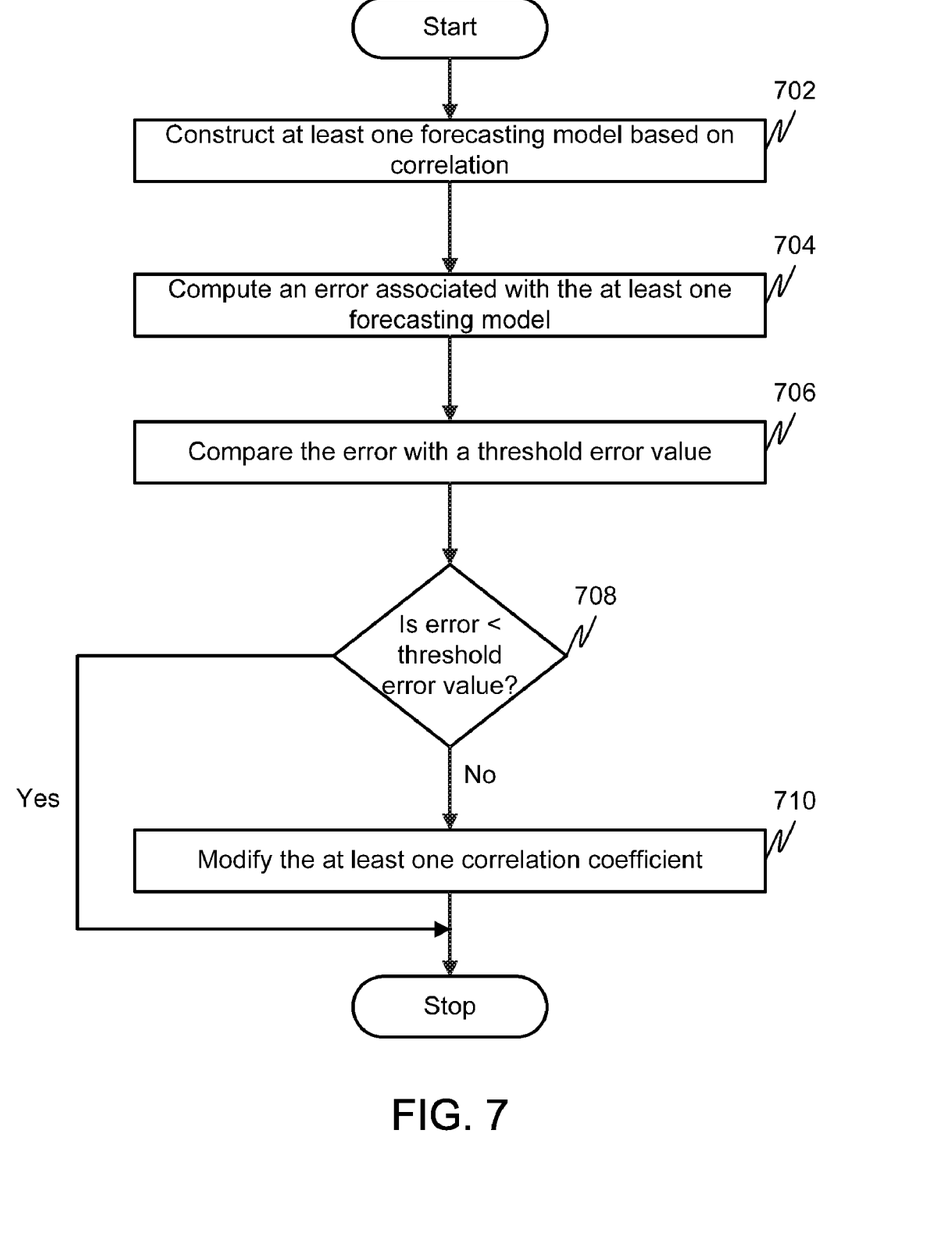
FIG. 7 illustrates a flowchart of a method for automatically constructing one or more forecasting models, in accordance with an embodiment of the invention.

FIG. 7 illustrates a flowchart of a method for automatically constructing one or more forecasting models, in accordance with an embodiment of the invention. After detecting correlations associated with the one or more test data sets, at step 702, processor 204 automatically constructs one or more forecasting models based on the correlations. Processor 204 may employ one or more of a dynamic programming and an optimization technique to construct the one or more forecasting models. The dynamic programming and the optimization technique define one or more objectives of the one or more forecasting models. Examples of the one or more objectives may include, but are not limited to maximizing an output and minimizing an output associated with the one or more forecasting models. The one or more objectives may be defined based on a state of the one or more objects associated with the one or more forecasting models. Examples of the state may include, but is not limited to an initial value, an intermediate value, a weight, a time period and a frequency spectrum. The dynamic programming and the optimization technique may include for example, but are not limited to Bellman Equation, Markov decision process, Hamilton-Jacobi-Bellman equation and Optimal Control theory.

The one or more forecasting models are constructed based on one or more of a correlation coefficient of the one or more correlation coefficients, an index of the one or more indices and a lag of the one or more lags associated with the one or more test data sets. The lag of the one or more lags is associated with the one or more objects of the one or more test data sets. A forecasting model of the one or more forecasting models is constructed for the one or more objects of the one or more lest data sets.

Processor 204 may use information associated with one or more of the one or more objects to construct the forecasting model. Examples of the forecasting model may include, but are not limited to a rolling forecast model, a moving average model, an exponential smoothing model, an extrapolation model, a linear prediction model, a trend estimation model, a growth curve, a regression analysis model, an Autoregressive Moving Average (ARMA) model, an Autoregressive Integrated Moving Average (ARIMA) model and an econometrics model. Further, the forecasting model may be one of a multivariate model and a univariate model.

Once the forecasting model is constructed, at step 704, processor 704 computes an error associated with the forecasting model. The error corresponds to variability or spread associated with the forecasting model. Examples of the error may include, but is not limited to a variance, a standard deviation and an interquartile range. The error may result from one or more of an observational error, a measurement error and intrinsic error associated with the forecasting model. Processor 204 determines a difference in an expected value and an observed value of the forecasting model to compute the error. The error may be an automatically computed value or a user defined value. For example, the error may be computed using the one or more statistical tests. After computing the error, at step 706, processor 204 compares the error with a threshold error value. The threshold error value may be automatically computed. Alternatively, the threshold error value may be user-inputted.

At step 708, a check is performed by processor 204 to determine whether the error is less than the threshold error value. If the error is less than the threshold error value, processor 204 executes the forecasting model for the one or more objects. For example, processor 204 may execute the forecasting model for predicting and anticipating the value of temperature of a city in future or past.

If the error is greater than the threshold error value, processor 204 modifies the correlation coefficient, at step 710. The correlation coefficient is modified automatically or based on user-input. Thereafter, processor 204 may again compare the error with the threshold error value to determine if the error is less than the threshold error value. If the error is not less than the threshold error value, processor 204 may modify the correlation coefficient. Thus, the correlation coefficient may be modified by processor 204 iteratively until the error is less than the threshold error value. Once the error is less than the threshold error value, the forecasting model is used for predicting the one or more objects in one or more of a space and time.

Figure 8:
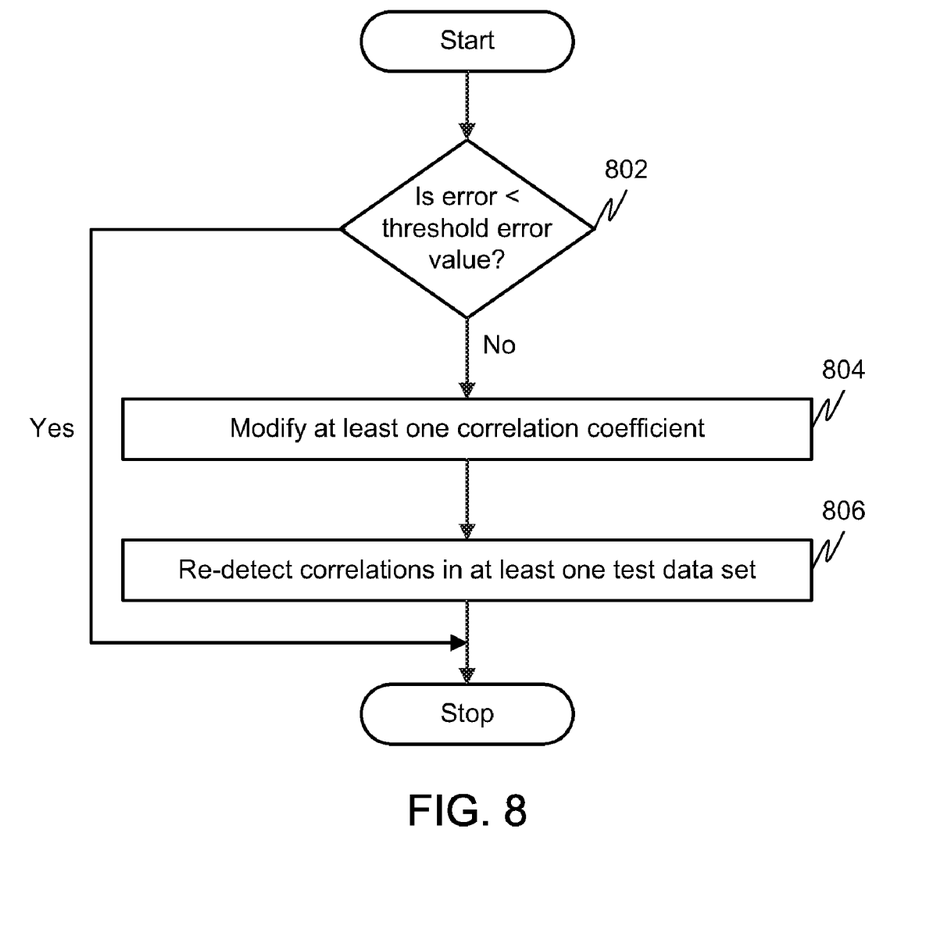
FIG. 8 illustrates a flowchart of a method for modifying one or more correlation coefficients, in accordance with an embodiment of the invention.

FIG. 8 illustrates a flowchart of a method for modifying one or more correlation coefficients, in accordance with an embodiment of the invention. At step 802, processor 204 determines whether the error associated with a forecasting model of the one or more forecasting models is less than the threshold error value. This has already been explained in conjunction with FIG. 7. If the error is greater than the threshold error value, processor 204 modifies the one or more correlation coefficients associated with the forecasting model at step 804. Thereafter at step 806, processor 204 automatically re-detects correlations associated with the one or more test data sets based on the modified one or more correlation coefficients.

For example, a forecasting model may be constructed based on a first correlation coefficient. Thereafter, processor 204 may determine and compare an error associated with the forecasting model with a threshold error value, if the error is greater than the threshold error value, processor 204 automatically modifies the first correlation coefficient to obtain a second correlation coefficient. Subsequently, processor 204 re-detects correlation associated with the one or more test data sets using the second correlation coefficient. Thereafter, a refined forecasting model is generated based on the re-detected correlation. Processor 204 may determine and compare an error associated with the refined forecasting model with the threshold error value. Thus, processor 204 automatically adjusts the one or more correlation coefficients to refine the forecasting model.

Figure 9:
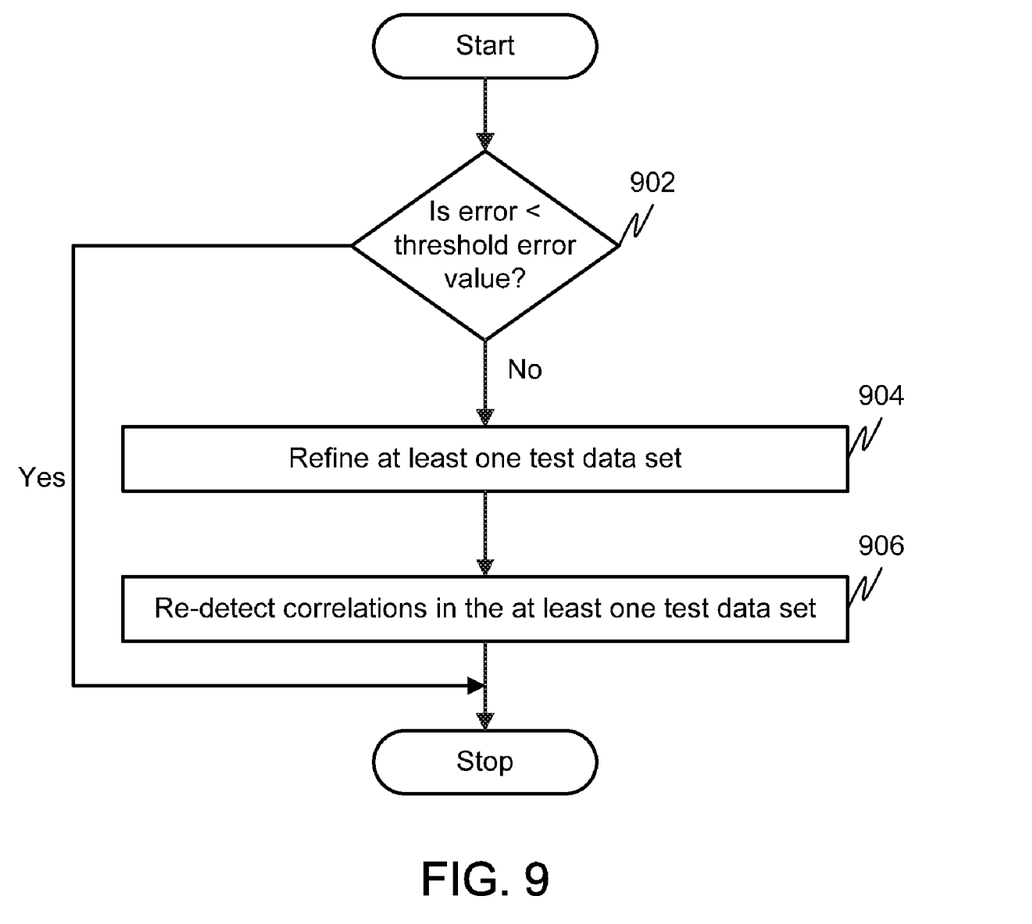
FIG. 9 illustrates a flowchart of a method for refining a forecasting model, in accordance with an embodiment of the invention.

FIG. 9 illustrates a flowchart of a method for refining a forecasting model, in accordance with an embodiment of the invention. At step 902, processor 204 determines whether the error associated with the forecasting model of the one or more forecasting models is less than the threshold error value. This has already been explained in conjunction with FIGS. 7 and 8. If the error is greater than the threshold error value, processor 204 may automatically refine the one or more test data sets at step 904. The one or more test data sets may be automatically refined when the one or more data sets is updated in memory 202. After refining the one or more test data sets, processor 204 automatically re-detects correlations associated with the one or more test data sets at step 906.

For example, a forecasting model may be constructed for a first test data set. Thereafter, processor 204 may determine and compare an error associated with the forecasting model with a threshold error value. If the error is greater than the threshold error value, processor 204 automatically refines the first lest data set to obtain a second test data set. Subsequently, processor 204 re-detects the correlation associated with the one or more test data sets using the second test data set. Thereafter, a refined forecasting model is generated based on the re-detected correlation. Processor 204 may determine and compare an error associated with the refined forecasting mode with the threshold error value. Thus, processor 204 automatically adjusts the one or more test data sets to refine the forecasting model.

In an exemplary embodiment of the invention, processor 204 generates a test data set $A_{mn}$ from the one or more data sets. The test data set $A_{mn}$ may be a matrix of 'm' rows and 'n' columns. The 'm' rows correspond to one or more objects. The 'n' rows correspond to one or more indices. The one or more objects and the one or more indices has already been explained in conjunction with FIG. 2. The test data set $A_{mn}$ is generated by fusing information associated with one or more data sets of the one or more data sets. The information associated with the one or more data sets is retrieved from one or more of a data acquisition system and a memory. The information associated with the one or more data sets corresponds to one or more objects of the one or more objects.

After creating the test data set $A_{mn}$, processor 204 selects a subset of the one or more objects. The test data set $A_{mn}$ is subjected to an Exponentially Weighted Moving Average (EWMA) smoothing to select a subset of the one or more objects based on a predefined criteria. Examples of the predefined criteria includes one or more of a context, an importance, a weight, a rank and so on. For example, one or more columns of the 'n' columns in the test data set $A_{mn}$ may be less important. Thus, EWMA removes the one or more objects associated with these less important one or more columns. It will be apparent to a person skilled in the art that, other techniques known in the art may be used to remove the one or more objects associated with the less important one or more columns.

Thereafter, processor 204 transforms the 'm' rows of the test data set $A_{mn}$ into a function space using a Fourier transform technique. As the test data set $A_{mn}$ is associated with a strictly increasing time index, the one or more objects associated with the 'm' rows are transformed into a frequency domain function space. Because of the Fourier transformation, the test data set $A_{mn}$ is transformed into a transformed test data set $P_{mn}$.

Subsequent to transformation, processor 204 may reduce the transformed test data set $P_{mn}$ to a canonical form $P_{mn}^k$ using a Singular Value Decomposition (SVD) technique. Processor 204 reduces the transformed test data set $P_{mn}$ to the canonical form $P_{mn}^k$ using first 'k' singular values. The first k singular values represent the first 'k' columns of the transformed test data set $P_{mn}$. For example, a matrix $P_{mn}^k$ includes the first k columns of $P_{mn}$. The first 'k' singular values are selected based on a predetermined level of reduction that is required for the transformed test data set $P_{mn}$. In an example, the first 'k' singular values are less than 'n' columns. The transformed test data set $P_{mn}$ reduced into the canonical form $P_{mn}^k$ may be expressed as:—

$$P_{mn}^k = \Sigma_{i=1}^k U_k S_k V_k^T \quad (1)$$

In equation 1, U and V are unitary matrix, S is a non negative diagonal matrix and $V^T$ denotes the transpose of the unitary matrix 'V'. Each row of the transformed test data set $P_{mn}$ that is reduced to the canonical form $P_{mn}^k$ is subtracted from its row average. For example, an average value associated with a first row of $P_{mn}^k$ is subtracted from each values of the first row. The canonical form $P_{mn}^k$ will be hereinafter referred to as the test data set $A_{mn}$ for sake of convenience.

Thereafter, processor 204 computes a correlated test data set $C_{mm}$. The correlated test data set $C_{mm}$ is computed using dot product of the test data set $A_{mn}$ and the transpose of the test data set $A_{mn}^T$. As the test data set $A_{mn}$ is associated with the strictly increasing time index, the elements of $C_{mm}$ represent a product of temporal history of an object (i) regarded as a row vector in the test data set $A_{mn}$ and temporal history of an object (j) regarded as a column vector in the test data set $A_{mn}^T$. If the test data set $A_{mn}$ is associated with a strictly increasing index like position, the elements of $C_{mm}$ represent a product of positional history of an object (i) regarded as a row vector in the test data set $A_{mn}$ and positional history of an object (j) regarded as a column vector in the test data set $A_{mn}^T$. The correlated test data set $C_{mm}$ may be expressed as:—

$$C_{mm} = A_{mn} A_{mn}^T \quad (2)$$

Once the correlated test data set $C_{mm}$ is computed, processor 204 automatically detects correlations in the one or more objects associated with the correlated test data set $C_{mm}$. Then, processor 204 compares the detected correlations with a correlation coefficient 'p' to categorize the correlations as a high correlation and a low correlation. The correlation coefficient 'p' may be automatically computed by processor 204 without any user input and apriori guidelines. A correlation corresponding to objects of the one or more objects having an absolute correlation value greater than an absolute value of the correlation coefficient 'p' may be categorized as the high correlation. Thus, all elements '$c_{ij}$' of $C_{mm}$ for a given row 'i' which are above the correlation coefficient 'p' correspond to set of objects 'i' with the higher correlation. In an example, 'j' is not equal to 'i'. Further, a correlation corresponding to objects of the one or more objects having an absolute correlation value lower than an absolute value of the correlation coefficient 'p' may be categorized as the lower correlation. Thus, all elements '$c_{ij}$' of $C_{mm}$ for a given row 'i' which are below the correlation coefficient 'p' correspond to set of objects with the lower correlation.

In addition, processor 204 may detect an anti-correlation between objects of the one or more objects associated. The anti-correlation indicates that objects of the one or more objects have an inverse relationship with each other. In anti-correlation as the value of a first object of the objects increases, the value of a second object of the objects decreases. Similarly, when the value of the first object decreases, the value of the second object increases.

After detecting correlations, processor 204 calculates a phase lag associated with the one or more objects of the correlated test data set $C_{mm}$ using autocorrelation and cross correlation methods. The phase lag is calculated for the one or more objects associated with the correlated test data set $C_{mm}$ that have high correlation. The processor 204 may also calculate a phase lag for the one or more objects of the correlated test data set $C_{mm}$ that have low correlation.

Thereafter, processor 204 automatically constructs a forecasting model for the one or more objects of the correlated test data set $C_{mm}$ that have high correlation. The forecasting model is generated using information associated with one or more of the one or more objects that have high correlation. As the one or more objects of the correlated test data set $C_{mm}$ are in the frequency domain, processor 204 employs Eigen frequencies to obtain least squares. The forecasting model may be expressed as:—

$$object_i(t) = \Sigma_{j \in Clst(i)} \Sigma_{g=1}^f a_g^f \sin(\omega_g^f t + L_{ij}) + b_g^f \cos(\omega_g^f t + L_{ij}) \quad (3)$$

In equation 3, 'i' corresponds to the one or more objects, 'Clst (i)' corresponds to the one or more objects which have correlation above the correlation coefficient 'p'. Further, 'l' represents a frequency. The 'l' varies from a period ranging from one to 2m.

Thereafter, processor 204 determines an error associated with the forecasting model. The error in the forecasting model may be determined using a Multivariate Analysis of Variance (MANOVA) technique. The error is then compared with a threshold error value. Based on the comparison, if the error is lower than the threshold error value, the forecasting model is used to project the one or more objects associated with the test data set $A_{mn}$ into the past and future. If the error is greater than the threshold error value, processor 204 automatically modifies the correlation coefficient. Thereafter, processor 204 reconstructs the forecasting model based on the modified correlation coefficient. Such a feedback information received enables processor 204 to tune the forecasting model.

Further, processor 204 refines the test data set $A_{mn}$ when new objects are retrieved by the data acquisition system and when new objects are stored in the memory. Processor 204 then reconstructs the forecasting model based on a refined test data set. The forecasting model may be reconstructed by processor 204 to tune the forecasting model using one or more of the above-mentioned steps.

The forecasting model may be utilized for a plurality of application areas. An application area of the plurality of application areas may include, but are not limited to detection of correlations in seismography, astrophysics, Search for Extraterrestrial Intelligence (SETI), solar physics, solar weather prediction, fraud detection, medical drug interactions, protein conformations, DNA, Single Nucleotide Polymorphisms (SNPs), advertisements, internet searching, politics, economics and electric transmission and so on.

Various embodiments of the invention provide system and method for detecting correlations in data sets. In this method, the test data sets generated are reduced to a canonical form thereby minimizing storage space and computational requirements associated with the test data sets. Automatic generation of the test data set and automatic detection of correlations associated with the test data set decreases operational time required for identifying correlations associated with the one or more objects. As the test data set is transformed into a symmetric correlated test data set, the amount of calculations required for detecting correlations and for constructing a forecasting model is reduced. Further, the forecasting model self tunes itself using feedback information associated with the forecasting model. The method can be used for facilitating human and automatic customer decisions for a process. The method can also be used for generating performance and status metrics reports for human and automatic management of the process and for predicting the future state of the process.

The method for analyzing at least one data set, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system for analyzing at least one data set, wherein a data set of the at least one data set comprises at least one object, the system comprising:
   a memory for storing the at least one data set; and
   a processor coupled to the memory, wherein the processor is configured to:
   determine at least one parameter associated with the at least one data set at runtime, a parameter of the at least one parameter is one of a context, a weight, a time period, a strength and a relevance;
   generate at least one test data set from the at least one data set at runtime in response to determining the at least one parameter, a test data set of the at least one test data set comprises at least one object of the at least one data set and at least one index, wherein the at least one object of the at least one test data set is associated with the at least one index;
   compute at least one correlation coefficient at runtime in response to generating the at least one test data set; and
   detect correlation corresponding to the at least one object of the at least one test data set based on the at least one correlation coefficient.

2. The system of claim 1, wherein the at least one data set is periodically updated.

3. The system of claim 1, wherein an index of the at least one index is one of a spatial index and a temporal index.

4. The system of claim 1, wherein the processor is further configured to fuse information associated with the at least one data set stored in the memory.

5. The system of claim 1, wherein the processor is further configured to reduce the at least one test data set to a canonical form in response to generating the at least one test data set.

6. The system of claim 1, wherein the processor is further configured to transform the at least one test data set into a function space in response to generating the at least one test data set.

7. The system of claim 6, wherein the processor is further configured to calculate at least one lag corresponding to the at least one test data set, the at least one lag corresponds to the at least one object of the at least one test data set, a lag of the at least one lag is one of a phase lag and a time lag.

8. The system of claim 1, wherein the processor is further configured to construct at least one forecasting model based on the correlation, wherein a forecasting model of the at least one forecasting model is associated with the at least one object of the at least one test data set.

9. The system of claim 8, wherein the processor is further configured to:
   compute an error associated with the forecasting model; and
   compare the error with a threshold error value.

10. The system of claim 9, wherein the processor is further configured to modify the at least one correlation coefficient based on the comparison between the error and the threshold error value.

11. The system of claim 10, wherein the processor is further configured to perform at least one of:
    refine the at least one test data set; and
    re-detect correlations in the at least one test data set.

12. A computer program product comprising a computer usable medium having a computer readable program for facilitating a method for analyzing at least one data set, wherein a data set of the at least one data set comprises at least one object, the method comprising:
    determining at least one parameter associated with the at least one data set at runtime, a parameter of the at least one parameter is one of a context, a weight, a time period, a strength and a relevance;
    generating at least one test data set from the at least one data set at runtime in response to determining the at least one parameter, a test data set of the at least one test data set comprises at least one object of the at least one data set and at least one index, wherein the at least one object of the at least one test data set is associated with the at least one index;

computing at least one correlation coefficient at runtime in response to generating the at least one test data set; and detecting a correlation corresponding to the at least one object of the at least one test data set based on the at least one correlation coefficient.

13. The computer program product claim 12, wherein an index of the at least one index is one of a spatial index and a temporal index.

14. The computer program product of claim 12, wherein generating the at least one test data set at runtime comprises fusing information associated with at least one data set stored in the computer useable medium.

15. The computer program product of claim 12 further comprising reducing the at least one test data set to a canonical form in response to generating the at least one test data set.

16. The computer program product of claim 12 further comprising transforming the at least one test data set into a function space in response to generating the at least one test data set.

17. The computer program product of claim 16 further comprising calculating at least one lag corresponding to the at least one test data set, the at least one lag corresponds to the at least one object of the at least one test data set, a lag of the at least one lag is one of a phase lag and a time lag.

18. The computer program product of claim 12 further comprising constructing at least one forecasting model based on the correlation, wherein a forecasting model of the at least one forecasting model is associated with the at least one object of the at least one test data set.

19. The computer program product of claim 18, wherein the forecasting model is a function of at least one of a correlation coefficient of the at least one correlation coefficient, an index of the at least one index and a lag of the at least one lag corresponding to the at least one test data set, the lag of the at least one lag is associated with the at least one object corresponds to the at least one test data set.

20. The computer program product of claim 19 further comprising:

computing an error associated with the forecasting model; and comparing the error with a threshold error value.

21. The computer program product of claim 20 further comprising modifying the correlation coefficient based on the comparison between the error and the threshold error value.

22. The computer program product of claim 21 further comprising:

refining the at least one test data set; and re-detecting correlations in the at least one test data set.

* * * * *